(12) United States Patent
Wilson et al.

(10) Patent No.: US 6,522,403 B2
(45) Date of Patent: Feb. 18, 2003

(54) COMPUTED TOMOGRAPHY IMAGING SPECTROMETER (CTIS) WITH 2D REFLECTIVE GRATING FOR ULTRAVIOLET TO LONG-WAVE INFRARED DETECTION ESPECIALLY USEFUL FOR SURVEYING TRANSIENT EVENTS

(75) Inventors: Daniel W. Wilson, Glendale, CA (US); Paul D. Maker, Arcadia, CA (US); Richard E. Muller, Altadena, CA (US); Pantazis Z. Mouroulis, Glendora, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 238 days.

(21) Appl. No.: 09/734,242

(22) Filed: Dec. 4, 2000

(65) Prior Publication Data

US 2002/0101587 A1 Aug. 1, 2002

(51) Int. Cl.$^7$ .............. G01J 3/18; G01J 3/28; G02B 5/18
(52) U.S. Cl. .............. 356/328; 359/571; 359/572
(58) Field of Search .............. 306/328, 51; 359/569, 359/570–572

(56) References Cited

U.S. PATENT DOCUMENTS

| | | | |
|---|---|---|---|
| 3,748,015 A | 7/1973 | Offner | 350/55 |
| 5,393,634 A | 2/1995 | Maker et al. | 430/1 |
| 5,880,834 A | 3/1999 | Chrisp | 356/328 |
| 5,953,161 A | * 9/1999 | Troxell et al. | 359/196 |
| 6,144,480 A | * 11/2000 | Li et al. | 359/254 |
| 6,342,969 B1 | * 1/2002 | Lee | 359/569 |

OTHER PUBLICATIONS

{1} T. Okamoto, I. Yamaguchi, "Simultaneous acquisition of spectral image information," Opt. Lett., vol. 16, No. 16, pp. 1277–1279 Aug. 15, 1991.
{2} F. V. Bulygin, G. N. Vishnyakov, G. G. Levin, and D. V. Karpukhin, "Spectrotomography—a new method of obtaining spectrograms of 2–D objects," Optics and Spectroscopy (USSR), vol. 71(6), pp. 561–563, 1991.
{3} T. Okamoto, A. Takahashi, I. Yamaguchi, "Simultaneous Acquisition of Spectral and Spatial Intensity Distribution," Applied Spectroscopy, vol. 47, No. 8, pp. 1198–1202, Aug. 1993.
{5} M. Descour and E. Dereniak, "Computed–tomography imaging spectrometer: experimental calibration and reconstruction results," Applied Optics, vol. 34, No. 22, pp. 4817–4826, 1995.

(List continued on next page.)

Primary Examiner—F. L. Evans
Assistant Examiner—Kara Geisel
(74) Attorney, Agent, or Firm—John H. Kusmiss

(57) ABSTRACT

The optical system of this invention is an unique type of imaging spectrometer, i.e. an instrument that can determine the spectra of all points in a two-dimensional scene. The general type of imaging spectrometer under which this invention falls has been termed a computed-tomography imaging spectrometer (CTIS). CTIS's have the ability to perform spectral imaging of scenes containing rapidly moving objects or evolving features, hereafter referred to as transient scenes. This invention, a reflective CTIS with an unique two-dimensional reflective grating, can operate in any wavelength band from the ultraviolet through long-wave infrared. Although this spectrometer is especially useful for rapidly occurring events it is also useful for investigation of some slow moving phenomena as in the life sciences.

38 Claims, 11 Drawing Sheets

OTHER PUBLICATIONS

{6} D. W. Wilson, P. D. Maker, and R. E. Muller, "Design and Fabrication of Computer–Generated Hologram Dispersers for Computed–Tomography Imaging Spectrometers," Optical Society of America Annual Meeting, Oct. 1996.

{7} M. R. Descour, C. E. Volin, E. L. Dereniak, T. M. Gleeson, M. F. Hopkins, D. W. Wilson, and P. D. Maker, "Demonstration of a computed–tomography imaging spectrometer using a computer–generated hologram disperser," Appl. Optics., vol. 36 (16), pp. 3694–3698, Jun. 1, 1997.

{8} P. D. Maker, and R. E. Muller, "Phase holograms in polymethyl metacrylate," J. Vac. Sci. Technol. B, vol. 10(6), 2516–2519, Nov./Dec. 1992.

{10} P. D. Maker, D. W. Wilson, and R. E. Muller, "Fabrication and performance of optical interconnect analog phase holograms made be electron beam lithography," in Optoelectronic Interconnects and Packaging, R. T. Chen and P. S. Guilfoyle, eds., SPIE Proceedings, vol. CR62, pp. 415–430, Feb. 1996.

{11} F. S. Pool, D. W. Wilson, P. D. Maker, R. E. Muller, J. J. Gill, D. K. Sengupta, J. K. Liu, S. V. Bandara, and S. D. Gunapala, "Fabrication and Performance of Diffractive Optics for Quantum Well Infrared Photodetectors," in Infrared Detectors and Focal Plane Arrays V, E. L. Dereniak and R. E. Sampson, Eds. Proc. SPIE vol. 3379, pp. 402–409, Jul. 1998.

{12} D. W. Wilson, P. D. Maker, R.E. Muller, "Reconstructions of Computed–Tomography Imaging Spectrometer Image Cubes Using Calculated System Matrices," in Imaging Spectrometry III, M. R. Descour, S. S. Shen, Eds, Proc. SPIE, vol. 3118, pp. 184–193, 1997.

{13} D.W. Wilson, P.D. Maker, R.E. Muller, "Calculation-–Based Calibration Procedure for Computed–Tomography Imaging Spectrometers," OSA Annual Meeting, Long Beach, CA, Oct. 14, 1997.

{14} P. D. Maker, R. E. Muller, D. W. Wilson, and P. Mouroulis, "New convex grating types manufactured by electron beam lithography," 1998 OSA Diffractive Optics Topical Meeting, Kailua–Kona, Hawaii, Jun. 8–11, 1998.

{15} P. Mouroulis, D. W. Wilson, P. D. Maker, and R. E. Muller, "Convex grating types for concentric imaging spectrometers," Appl. Optics, vol. 37, pp. 7200–7208, Nov. 1, 1998.

{16} F. V. Bulygin and G. G. Levin, "Spectrotomography of Fluorescent Objects," Optics and Spectroscopy (USSR), vol. 84, No. 6, pp. 894–897, Aug. 15, 1997.

{17} L. A. Shepp and Y. Vardi, "Maximum likelihood reconstruction for emission tomography," IEEE Trans. Med. Imag., MI–1, No. 2, pp 113–122 (1982).

{18} M. R. Descour, B. K. Ford, D. W. Wilson, P. D. Maker, G. H. Bearman, "High–speed spectral imager for imaging transient flourescence phenomena," in Systems and Technolgies for Clinical Diagnostics and Drug Discovery, G. E. Cohn, Ed., Proc. SPIE vol. 3259, pp. 11–17, Apr. 1998.

{19} B. K. Ford, C. E. Volin, M. R. Descour, J. P. Garcia, D. W. Wilson, P. D. Maker, and G. H. Bearman, "Video–rate spectral imaging of fluorescence phenomena," in Imaging Spectrometry IV, M. R. Descour and S. S. Shen, Eds., Proc. SPIE vol. 3438, p. 313–320, Oct. 1998.

{20} C. E. Volin, B. K. Ford, M. R. Descour, J. P. Garcia, D. W. Wilson, P. D. Maker, and G. H. Bearman, "High–speed spectral imager for imaging transient flourescence phenomena," Applied. Optics, vol. 37, pp. 8112–8119, Dec. 1, 1998.

{21} K. Lange and R. Carson, "EM Reconstruction Algorithms for Emission and Transmission Tomography," Journal of Computer Assisted Tomography, vol. 8, No. 2, pp. 306–316, Apr. 1984.

{24} L. Mertz, "Concentric spectrographs," Appl. Optics, vol. 16, No. 12, pp. 3122–3124, Dec. 1977.

{25} F. V. Bulygin and G. G. Levin, "Spectral of 3–D objects," Optics and Spectroscopy (USSR), vol. 79, No. 6, pp. 890–894, 1995.

{26} M. R. Descour and E. L. Dereniak, "Nonscanning no–moving–parts imaging spectrometer," SPIE vol. 2480, pp. 48–64, Jan. 1995.

{27} M. R. Descour, R. A Schowengerdt and E. L. Dereniak, "Analysis of the Computed–Tomography Imaging Spectrometer by singular value decomposition," SPIE vol. 2758, pp. 127–133, Jan. 1996.

{28} M. R. Descour, C. E. Volin, E. L. Dereniak and K. J. Thome, "Demonstration of a high–speed nonscanning imaging spectrometer," Opt. Lett., vol. 22, No. 16, pp. 1271–1273 Aug. 15, 1997.

* cited by examiner

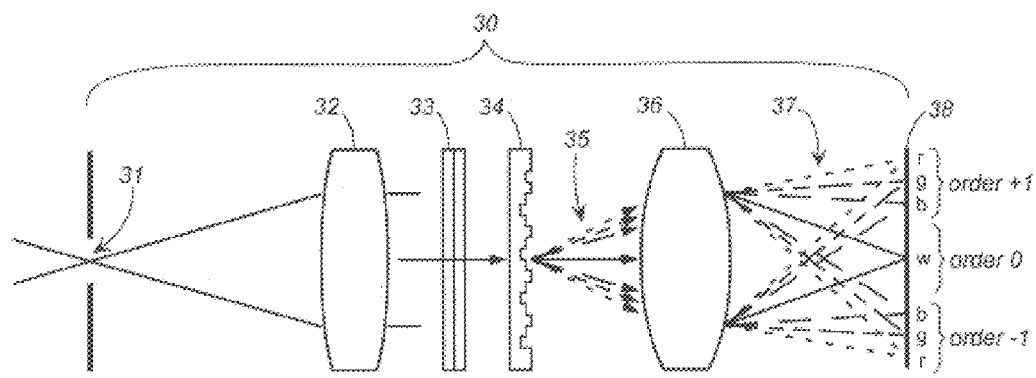
FIG. 1 (Prior Art)
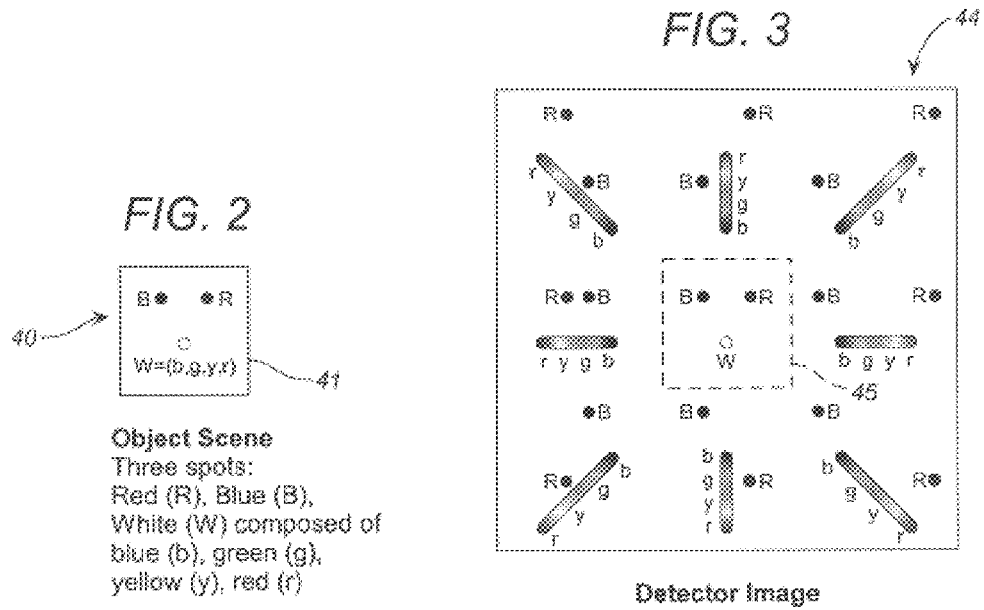
FIG. 2
Object Scene
Three spots:
Red (R), Blue (B),
White (W) composed of
blue (b), green (g),
yellow (y), red (r)
FIG. 3
Detector Image

COMPUTED TOMOGRAPHY IMAGING SPECTROMETER (CTIS) WITH 2D REFLECTIVE GRATING FOR ULTRAVIOLET TO LONG-WAVE INFRARED DETECTION ESPECIALLY USEFUL FOR SURVEYING TRANSIENT EVENTS

The invention described herein was made in the performance of work under a NASA Contract, and is subject to the provisions of Public Law 96-517 (35 USC 202) in which the Contractor has elected not to retain title.

BACKGROUND OF THE INVENTION

The following references represent the state-of-the-art of this invention and are referred to hereinafter.

{1} T. Okamoto, I. Yamaguchi, "Simultaneous acquisition of spectral image information," Opt. Lett., Vol. 16, No. 16, pp. 1277–1279 Aug. 15, 1991.

{2} F. V. Bulygin, G. N. Vishnyakov, G. G. Levin, and D. V. Karpukhin, "Spectrotomography-a new method of obtaining spectrograms of 2-D objects," Optics and Spectroscopy (USSR) Vol. 71(6), pp.561–563, 1991.

{3} T. Okamoto, A. Takahashi, I. Yamaguchi, "Simultaneous Acquisition of Spectral and Spatial Intensity Distribution," Applied Spectroscopy, Vol. 47, No. 8, pp. 1198–1202, Aug. 1993.

{4} M. R. Descour, Non-scanning Imaging Spectrometry, Ph.D Dissertation, University of Arizona, 1994.

{5} M. Descour and E. Dereniak, "Computed-tomography imaging spectrometer: experimental calibration and reconstruction results," Applied Optics, Vol. 34, No. 22, pp. 4817–4826, 1995.

{6} D. W. Wilson, P. D. Maker, and R. E. Muller, "Design and Fabrication of Computer-Generated Hologram Dispersers for Computed-Tomography Imaging Spectrometers," Optical Society of America Annual Meeting, October 1996.

{7} M. R. Descour, C. E. Volin, E. L. Dereniak, T. M. Gleeson, M. F. Hopkins, D. W. Wilson, and P. D. Maker, "Demonstration of a computed-tomography imaging spectrometer using a computer-generated hologram disperser," Appl. Optics., Vol. 36 (16), pp. 3694–3698, Jun. 1, 1997.

{8} P. D. Maker, and R. E. Muller, "Phase holograms in polymethyl methacrylate," J. Vac. Sci. Technol. B, Vol. 10(6), 2516–2519, November/December 1992.

{9} P. D. Maker and R. E. Muller, "Continuous Phase and Amplitude Holographic Elements," U.S. Pat. No. 5,393,634, Feb. 28, 1995.

{10} P. D. Maker, D. W. Wilson, and R. E. Muller, "Fabrication and performance of optical interconnect analog phase holograms made be electron beam lithography," in Optoelectronic Interconnects and Packaging, R. T. Chen and P. S. Guilfoyle, eds., SPIE Proceedings, Vol. CR62, pp. 415–430, February 1996.

{11} F. S. Pool, D. W. Wilson, P. D. Maker, R. E. Muller, J. J. Gill, D. K. Sengupta, J. K. Liu, S. V. Bandara, and S. D. Gunapala, "Fabrication and Performance of Diffractive Optics for Quantum Well Infrared Photodetectors," in Infrared Detectors and Focal Plane Arrays V, E. L. Dereniak and R. E. Sampson, Eds. Proc. SPIE Vol. 3379, pp. 402–409, July 1998.

{12} D. W. Wilson, P. D. Maker, R.E. Muller, "Reconstructions of Computed-Tomography Imaging Spectrometer Image Cubes Using Calculated System Matrices," in Imaging Spectrometry III, M. R. Descour, S. S. Shen, Eds, Proc. SPIE, Vol. 3118, pp. 184–193, 1997.

{13} D. W. Wilson, P. D. Maker, R. E. Muller, "Calculation-Based Calibration Procedure for Computed-Tomography Imaging Spectrometers," OSA Annual Meeting, Long Beach, Calif., Oct. 14, 1997.

{14} P. D. Maker, R. E. Muller, D. W. Wilson, and P. Mouroulis, "New convex grating types manufactured by electron beam lithography," 1998 OSA Diffractive Optics Topical Meeting, Kailua-Kona, Hawaii, Jun. 8–11, 1998.

{15} P. Mouroulis, D. W. Wilson, P. D. Maker, and R. E. Muller, "Convex grating types for concentric imaging spectrometers," Appl. Optics, vol. 37, pp. 7200–7208, Nov. 1, 1998.

{16} F. V. Bulygin and G. G. Levin, "Spectrotomography of Fluorescent Objects," Optics and Spectroscopy (USSR), Vol. 84, No.6, pp. 894–897, Aug. 15, 1997.

{17} L. A. Shepp' and Y. Vardi, "Maximum likelihood reconstruction for emission tomography," IEEE Trans. Med. Imag., MI-1, No. 2, pp 113–122 (1982).

{18} M. R. Descour, B. K. Ford, D. W. Wilson, P. D. Maker, G. H. Bearman, "High-speed spectral imager for imaging transient fluorescence phenomena," in Systems and Technologies for Clinical Diagnostics and Drug Discovery, G. E. Cohn, Ed., Proc. SPIE vol. 3259, pp. 11–17, April, 1998.

{19} B. K. Ford, C. E. Volin, M. R. Descour, J. P. Garcia, D. W. Wilson, P. D. Maker, and G. H. Bearman, "Video-rate spectral imaging of fluorescence phenomena," in Imaging Spectrometry IV, M. R. Descour and S. S. Shen, Eds., Proc. SPIE vol. 3438, p. 313–320, October 1998.

{20} C. E. Volin, B. K. Ford, M. R. Descour, J. P. Garcia, D. W. Wilson, P. D. Maker, and G. H. Bearman, "High-speed spectral imager for imaging transient fluorescence phenomena," Applied. Optics, vol. 37, pp. 8112–8119, Dec. 1, 1998.

{21} K. Lange and R. Carson, "EM Reconstruction Algorithms for Emission and Transmission Tomography," Journal of Computer Assisted Tomography, vol. 8, no. 2, pp. 306–316, April 1984.

{22} U.S. Pat. No. 3,748,015 to Offner, Jul. 24, 1973.

{23} U.S. Pat. No. 5,880,834 to Chrisp, Mar. 9, 1999.

{24} L. Mertz, "Concentric spectrographs," Appl. Optics, Vol. 16, No. 12, pp. 3122–3124, Dec. 1977.

{25} F. V. Bulygin and G. G. Levin, "Spectral of 3-D objects," Optics and Spectroscopy (USSR), Vol. 79, No.6, pp. 890–894, 1995.

{26} M. R. Descour and E. L. Dereniak, "Nonscanning no-moving-parts imaging spectrometer," SPIE Vol. 2480, pp. 48–64, Jan. 1995.

{27} M. R. Descour, R. A Schowengerdt, E. L. Dereniak, K. J. Thome, A. B. Schumacher, D. W. Wilson and P. D. Maker "Analysis of the Computed-Tomography Imaging Spectrometer by singular value decomposition," SPIE Vol. 2758, pp. 127–133, Jan. 1996.

{28} M. R. Descour, C. E. Volin, E. L. Dereniak and K. J. Thome, "Demonstration of a high-speed nonscanning imaging spectrometer," Opt. Lett., Vol. 22, No. 16, pp. 1271–1273 Aug. 15, 1997.

The above numbered references are referred to hereinafter by their number N enclosed in special brackets, e.g. {10} or where multiple references are referred to by their numbers, e.g. {2, 16, 25}.

A type of spectrometer known in the field of optics as a "computed tomography imaging spectrometer", or CTIS hereinafter, enables transient-event spectral imaging by capturing spatial and spectral information in a single snapshot. This has been accomplished by imaging a scene through a two-dimensional (2D) grating disperser as illustrated in the prior-art transmissive system 30 of FIG. 1.

Referring to FIGS. 1–3, in this invention a primary optical system forms a real image 40 of the scene on a rectangular aperture 31 that serves as a field stop 41. Since primary optical systems are well known in the art, for example telescopes, microscopes, endoscopes, etc., such systems are not shown in the drawings.

For example, in FIG. 2, spots of visible light, namely a blue spot B, a red spot R and a white spot W, in the field stop 41 are collimated in a lens 32, filtered through a wide-band filter means 33, and passed through a 2D grating disperser 34 which produces a 2D array of diffraction orders 35. A final focusing element, such as lens 36, re-images the various diffraction orders of light 37 onto a focal plane array (FPA) detector 38, e.g. a charge coupled device, that records the intensity but not the color of the incident light. Each diffraction order transmitted from grating disperser 34 produces a spectrally dispersed image 44 of the scene, except for the undiffracted "zeroth" order which produces an undispersed image in the dashed center area 45 of FPA detector 38 as illustrated in FIG. 3.

A prior art technique can be used to reconstruct the spectra of all the points in the object scene from the captured intensity pattern and knowledge of how points and wavelengths in the field stop map to pixels on the detector. This reconstruction problem is mathematically similar to that encountered in three-dimensional volume imaging in medicine. Hence it is possible to reconstruct the pixel spectra from a CTIS image by one of several iterative algorithms that have been developed for medical emission tomography {17, 21}. In this prior art technique, there are no moving parts or narrow-band filters, and a large fraction of collected light is passed to the detector at all times with CTIS.

Therefore, the disadvantage with current imaging spectrometers is that they are used to perform either (1) spatial scanning through a slit, i.e. a one-dimensional aperture thereby producing spectra in a line or a one-dimensional spectra, or (2) spectral scanning through a narrow-band filter which causes both loss of signal and data corruption for transient scenes.

A CTIS instrument can be made compact, rugged, and reliable, and can be used wherever spectral imaging is needed. The CTIS instrument concept originated in Japan {1, 3} and Russia {2, 16, 25}, and has been advanced by Jet Propulsion Laboratory (JPL) and others {4, 5, 7, 12, 18–20, 26–28}.

The heart of the prior art computed-tomography imaging spectrometer is the two-dimensional grating disperser 34. In all implementations preceding that by JPL {12} and Descour et al. {7}, the two-dimensional grating disperser was realized by stacking and crossing one-dimensional transmissive gratings.

This type of spectrometer had a number of disadvantages, namely (1) the total throughput efficiency was low, (2) only a few diffracted orders contained most of the intensity and saturated the FPA detector 38, and (3) the pattern of dispersed images did not fill the FPA detector area efficiently.

JPL overcame all of these problems by using a computer-generated hologram (CGH) disperser {7}. JPL's CTIS-specific CGH design algorithms generated designs having high total efficiency and nearly arbitrary patterns of order efficiencies. To accurately fabricate such computer-generated holograms, JPL developed an analog direct-write electron-beam lithography technique that requires only a single development step {8, 10}. This technique allowed JPL to produce fine-featured surface-relief profiles in thin films of polymethyl methacrylate (PMMA). Diffractive optical elements fabricated by such E-beam method demonstrated better performance than elements fabricated by optical lithography or laser writing. For infrared applications that required deeper structures than the E-beam technique could produce, JPL demonstrated the capability of transferring the PMMA surface profile with depth amplification into GaAs semiconductor wafers by reactive ion etching {11}.

Prior to reconstructing the spectra of unknown scenes, a CTIS system had to be calibrated. In other words, the process in which points of light in the field stop 41, were propagated through the spectrometer system and were recorded by the detector 38 had to be determined.

Since the light entering the field stop was polychromatic, there was actually a three-dimensional input to the system, i.e. spatial dimensions x and y, and wavelength dimension lambda, $\lambda$. To make the problem manageable, the three dimensional spatial-spectral volume was subdivided into small voxels {5} as shown in FIG. 4 {13}. The term "voxel" as used herein means a spatial spectral sub-volume element. Calibration then became the determination of which detector pixels were illuminated by a given scene voxel and with what strength, which is referred to herein as "scene-voxel to detector-pixel mapping".

This scene-voxel to detector-pixel mapping is represented as a system transfer matrix H that has $n_d$ rows and $n_s$ columns, where $n_d$ is the number of detector pixels and $n_s$ is the number of scene voxels. For any given scene S composed of voxels s=1 ... $n_s$, the detector image D composed of pixels d=1 ... $n_d$ is given by the matrix equation D=H·S, where S and D are arranged as column vectors and all sources of noise have been ignored.

In this invention the technique for calibrating CTIS systems is a combination of measurements with numerical simulations. First, the efficiency of the system is measured at all wavelengths, and in all diffraction orders, but at only one spatial location in the field stop. This is done by placing a monochromator-illuminated optical fiber in the center of a field stop, and recording detector images for many wavelengths in the spectral band of interest, e.g. 450–750 nm.

Each of these detector images is then computer analyzed to determine the efficiency, position, and aberrations, if severe, of each diffraction order at the given wavelength. It should be noted that this measurement included the spectrally dependent transmission of all the optical elements and the responsivity of the focal plane array detector.

With the system efficiency known, we then used simulation to derive the system transfer matrix H that maps voxels in the field stop to pixels on the detector. This is accomplished by tracing many rays from each voxel through the system, utilizing the measured information and keeping track of the resulting scene-voxel to detector-pixel connection weights. This simulation step can be replaced with actual measurements of scene-voxel to detector-pixel mappings by moving the fiber to each spatial location within the object scene plane. However, this increases the effort significantly and does not allow the voxel sizes (scene resolution) to be adjusted after calibration.

Once the system transfer matrix H is known, unknown scenes could then be imaged and their spectra reconstructed. We used an iterative expectation-maximization (EM) algorithm {5}. This algorithm had been developed for reconstructing positron-emission tomography medical images {17, 21}, but other known emission tomography algorithms are also applicable.

The reconstruction is started with an initial estimate for the scene S that is typically unity. Then a predicted detector vector $D_p$ is calculated, $$D_p = H \cdot S \tag{1}$$

Corrections are then made to the scene based on the back projection of the ratio of the measured detector and predicted detector, $$s'_j = (s_j/\text{sum}_i(H_{i,j})) \cdot (H^T \cdot (D_m/D_p))_j \quad (2)$$

for $j = 1 \ldots n_s$ where $\text{sum}_i$ indicates a summation over i for each transfer matrix component $H_{i,j}$, $H^T$ is the transpose of H, $D_m$ is the measured detector image, $D_p$ is the predicted detector image, and where the ratio of the D vectors is performed element by element. The parameter s', in Eq. (2) signifies that it is the next iteration of s. If $D_m = D_p$, then the correction factor becomes unity and there is no change to S. Eq. (1) and Eq. (2) are then used iteratively until the predicted detector matched the measured detector to a desired error tolerance or until the improvement stagnates. Typically 10–30 iterations were required for acceptable scene reconstructions.

SUMMARY OF THE INVENTION

Referring to FIGS. 5–7, to illustrate the feasibility of the reconstructive feature of this invention, a test simulation was conducted with a scene of overlapping monochromatic numbers 1 to 10 as shown in FIG. 5 {6, 13}. FIG. 5, therefore, depicts an arbitrary artificial multi-spectral scene which, with CTIS, became a focal plane array image of a CTIS-dispersed scene as shown in FIG. 6. Tomographic reconstruction of the focal plane array image of FIG. 6 was used to convert the image into spatial and spectral data consisting of wavelengths over 10 bands each comprising 32×32 pixels as shown in FIG. 7.

To illustrate the use of this invention for spectral imaging of transient scenes, an experiment was conducted as follows. A transmissive CTIS system was constructed and calibrated as described above. FIG. 8 is a diagram of the CTIS system having a charge-coupled device (CCD) camera 100, a re-imaging lens unit 101, assembly 102 comprising a 2D transmissive grating and wide-band filters, collimating lens unit 103, object scene aperture unit 104, and primary imaging lens unit 105. In one embodiment, CCD camera 100 has 768×480 pixels, with shutter speed of 30 frames/sec., lens unit 101 has a 25 mm focal length, unit 102 passes and disperses 450 nm–750 nm wavelengths, lens unit 103 has a 75 mm focal length, aperture unit 104 is 2.5 mm×2.5 mm square, and lens unit 105 has a 25 mm focal length.

A scene consisting of 4 colored letters, namely a red letter R, a yellow letter Y, a green letter G, and a blue letter B, on a circular disc having a black background 110 as shown in FIG. 9, was mounted on a platform rotating at a speed such that the human eye could not discern individual letters. Camera 100 was set to have an exposure time short enough to freeze the action in the scene and record an image.

The image captured by CTIS detector 115 was transferred to computer 116 and reconstructed into 62×72 pixels×30 spectral bands (10 nm/band). FIG. 10 shows the actual reconstructed panchromatic image in black and white (summation of all bands for each pixel) with colors reversed to lighten the image, and FIG. 11 shows the average spectra of the each of the colored letters R, Y, G and B (red, yellow, green and blue, respectively) shown in FIG. 9. In our process, and in this example, the CTIS algorithm was improved by using our "undiffracted image constraint" process of this invention which is discussed more fully below.

Having demonstrated feasibility of the CTIS technique for visible wavelengths, the following demonstrates how CTIS feasibility can extended to cover the entire ultraviolet to long-wave infrared portion of the spectrum.

Reflective CTIS

Prior art CTIS systems have been transmissive in nature and thus require refractive lenses. The problem with a transmissive design is that for operation in the ultraviolet and infrared portions of the spectrum, there are few materials that transmit well. Hence it is more difficult to design achromatized lenses. Furthermore, multi-element refractive lenses can become large and heavy, severely limiting the range of applications.

Since reflective systems do not exhibit chromatic aberration and are thus relatively easy to scale to different wavelengths, we found, in this invention, that we could overcome these problems with the transmissive system by designing a reflective CTIS based on the Offner design.

The Offner design is a particular reflective configuration that consists of two concentric mirrors (U.S. Pat. No. 3,748,015 {22}). Traditional "slit imaging" spectrometers based on the Offner design, see for example U.S. Pat. No. 5,880,834 {23}, have become popular in recent years because they can be made very compact and exhibit excellent imaging. However, the difficulty with the Offner form is that it requires the grating to be fabricated on a convex surface {23}. U.S. Pat. Nos. 3,748,015 and 5,880,834 are hereby incorporated herein by reference to show portions of various optical arrangements which can be used in this invention.

In our Offner design, we had recently improved our E-beam technique to allow fabrication on non-flat substrates {14, 15}, thereby producing ruled or "one-dimensional" gratings. Such convex blazed gratings demonstrated higher efficiency and lower scattered light than diamond-ruled and holographic gratings as used in U.S. Pat. No. 5,880,834 {23}.

In one embodiment of this invention, we improved the prior art CTIS. We achieved superior results when we started the iterative process with an initial estimate used in Eq. (1) that was the product of the measured undiffracted spatial image with unity spectra.

With regard to the CTIS reconstruction algorithm, it was known that medical images reconstructed using the EM algorithm can develop edge effects and noise as the iterations proceed. Researchers in the positron-emission tomography community had developed a number of techniques to suppress such degrading effects. In this invention, however, we found that such artifacts can be minimized in CTIS reconstructions by constraining the solution so that the scene summed along the spectral dimension, with proper spectral weighting, agreed with the measured undiffracted image. The constraint uses the measured spatial information in the scene to reduce the dimensionality of the unknown information. Hence it produces more accurate spectra in addition to reducing spatial artifacts. We refer to our improvement for producing a reconstructed spectral and spatial object scene as reconstructing the object scene with "undiffracted image constraint."

The term "undiffracted image constraint" process as used herein means that the following additional steps are performed while reconstructing the image scene:

(a) calculating the predicted undiffracted image based on the current estimate of the scene; thereafter (b) calculating a new set of scaling factors for the scene that force the predicted undiffracted image to equal the measured undiffracted image; and thereafter (c) uniformly scaling the entire scene so that the total number of photons in a predicted detector image remains constant from iteration to iteration.

Thereafter, the process for reconstructing the image scene resumes at Eq. 1.

The following is an example of our undiffracted image constraint process. After equation (2) is performed, the new predicted undiffracted image is calculated as follows:

$$D_p^{undif} = H^{undif} \cdot S' \quad (3)$$

where $H^{undif}$ is the part of the system transfer matrix that maps to the undiffracted order. To force agreement between the predicted and measured undiffracted images, we scale all the scene voxels that contribute to a given undiffracted image pixel (x,y). The scaling factor is the ratio of the measured and predicted (x,y)th pixels in the undiffracted image as follows:

$$S''_{x,y,\lambda} = d_m^{undif}{}_{x,y} / d_p^{undif}{}_{x,y} \cdot S'_{x,y,\lambda} \quad x=1\ldots n_x, \quad y=1\ldots n_y, \quad \lambda=1\ldots n_\lambda \quad (4)$$

where x and y are the spatial indices and $\lambda$ is the spectral band index. Note that the same scaling factor is used for all voxels with the same spatial location. This is because the undiffracted image is just a weighted sum along the spectral dimension of the scene voxel cube (FIG. 4). This weighted sum is calculated in Eq. 3. The application of Eq. (4) creates an energy imbalance compared to the original predicted scene S. To correct this imbalance, we scale the entire scene so that the energy that falls on the detector is conserved from iteration to iteration, $$S''' = S'' \cdot \text{sum}(H \cdot S) / \text{sum}(H \cdot S'') \quad (5)$$

We have found that our improved CTIS process for imposing the undiffracted image constraint works well in practice.

In a alternative embodiment of this invention, the process constrains the maximization step (Eq. 2) of the EM algorithm, so as to find S that minimizes the error in $D_m = H \cdot S$ subject to the constraint that $D_m^{undif} = H^{undif} \cdot S$. One technique used for finding solutions to this type of problem is the method of Lagrange multipliers.

Other experiments have been performed that compare CTIS reconstructed spectra to known spectra of emission and reflectance targets. In most cases, agreement to within approximately ±5% is obtained throughout the CTIS wavelength band of operation.

BRIEF DESCRIPTION OF THE DRAWINGS

FIG. 1. is an optical layout of a prior art CTIS system.

FIG. 2 is a field stop scene composed of blue, red, and white dots.

FIG. 3 illustrates how the scene of FIG. 2 is dispersed by a CTIS system of FIG. 1 having a 3×3 grating disperser, and further demonstrating that each dispersed image provides unique information about the scene.

FIGS. 5–7 illustrate a simulation of CTIS imaging an artificial multi-spectral scene, in which FIG. 5 is an artificial multi-spectral scene of various colored number 1 to 10.

FIG. 6 is a greatly reduced FPA image of the CTIS-dispersed scene of FIG. 4.

FIG. 7 is a slightly reduced tomographic reconstruction of the FPA image of FIG. 6 separated into spatial-spectral data consisting of 10 bands of 32×32 pixels.

DESCRIPTION OF THE PREFERRED EMBODIMENTS

To avoid the above-mentioned problems associated with prior art CTIS, in this invention we employ a two-dimensional reflective diffraction grating. By the term "two-dimensional or 2D reflective diffraction grating we mean to exclude ruled or one dimensional diffraction gratings that produce spectra in one dimension or along a line.

Figure 4:
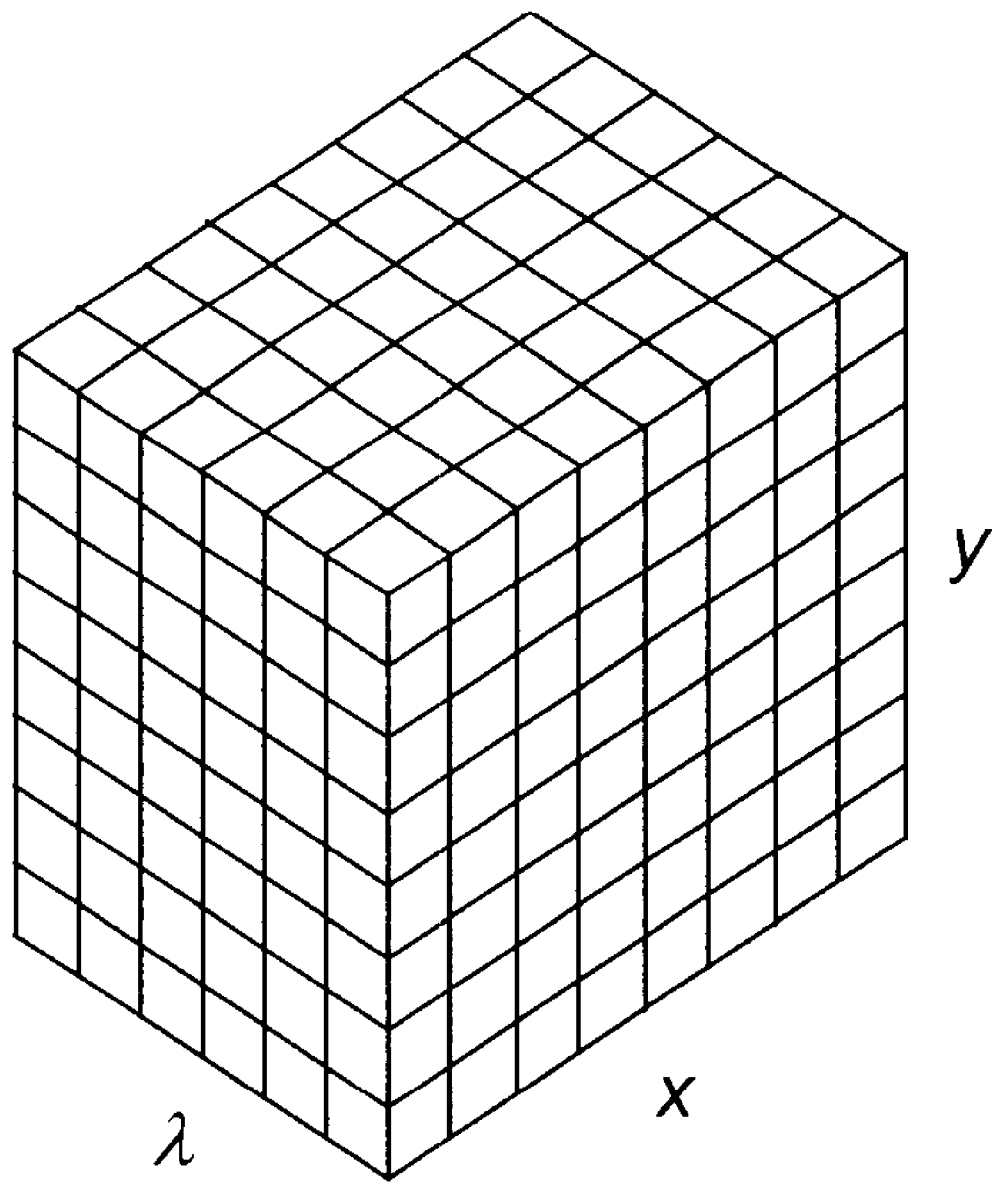
FIG. 4 illustrates a voxel cube.
Figure 5:
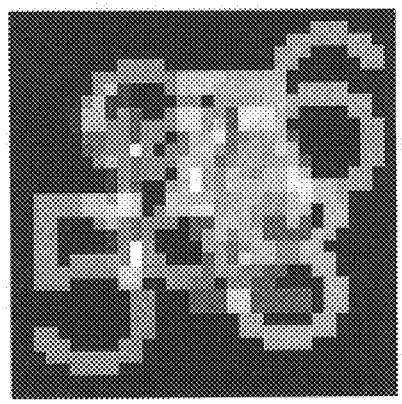
Figure 6:
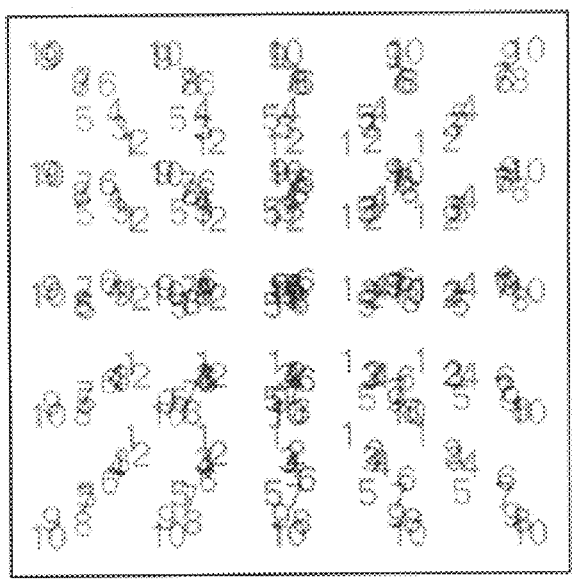
Figure 7:
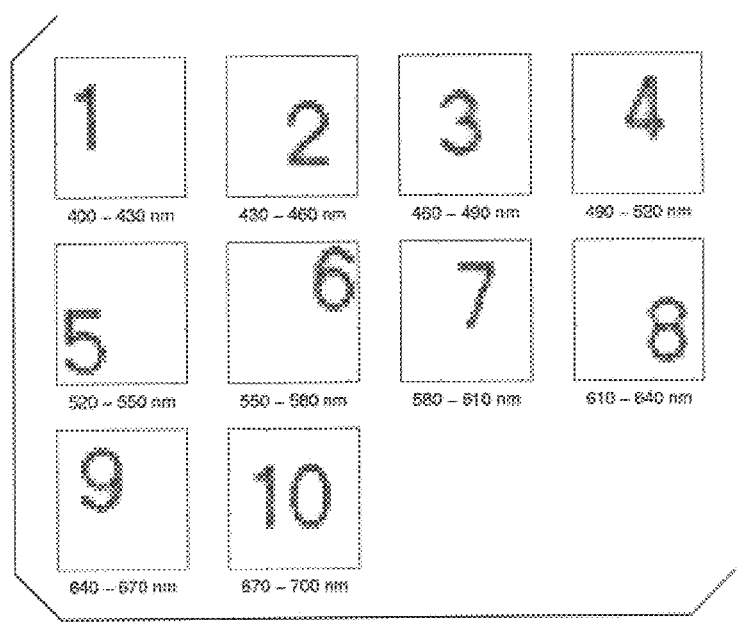
Figure 8:
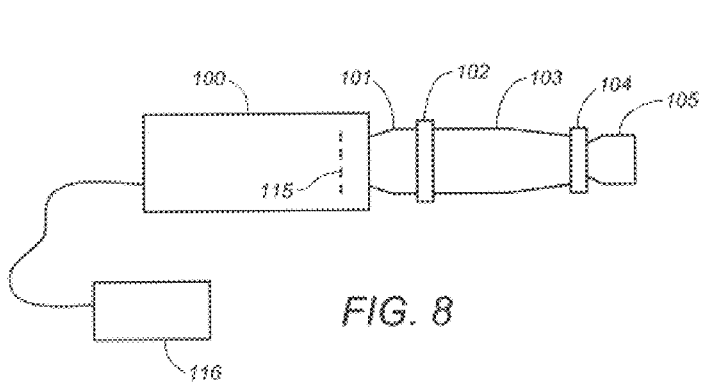
FIG. 8 is a schematic diagram of a transmissive CTIS used for performing transient-event spatial-spectral imaging.
Figure 9:
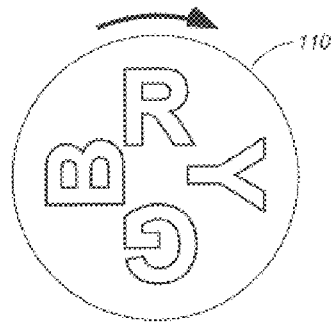
FIG. 9 is a drawing of the rotating-letter disk that is used as the transient scene.
Figure 10:
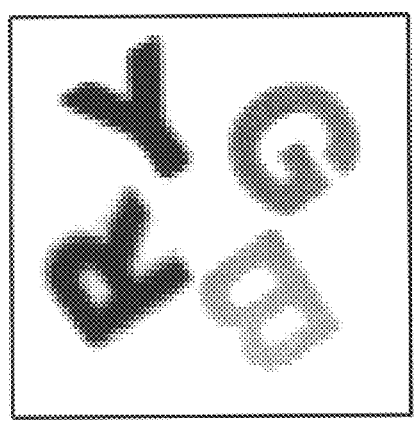
FIG. 10 is the reconstructed panchromatic image of the rotating disk.
Figure 11:
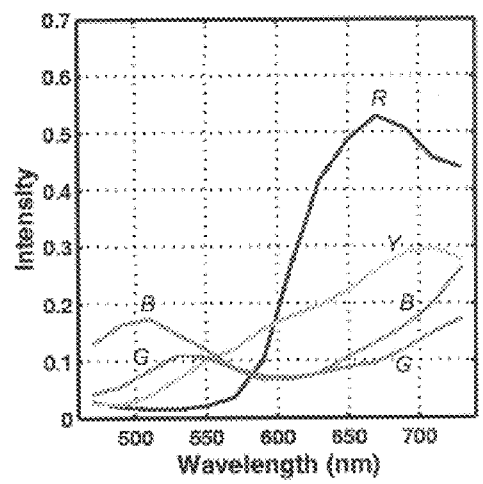
FIG. 11 is a plot of the spectra for each letter (average of many pixels).
Figure 12:
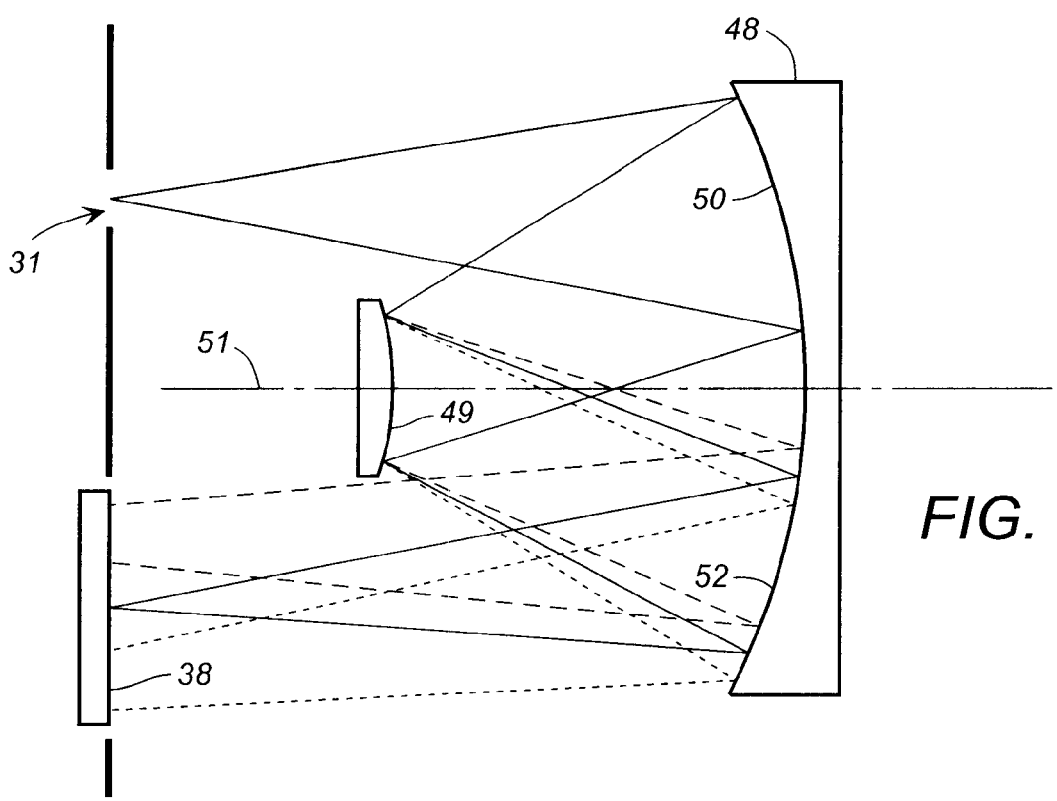
FIG. 12 is a schematic drawing of an embodiment of this invention showing the principle optical components of this invention.

FIG. 12 show the principle optical components of one embodiment of this invention, comprising a 2D object scene aperture 31, an unitary primary mirror assembly 48 having a first concave mirror 50 and a second concave mirror 52, a 2D reflective convex diffraction grating 49 having axis 51, and an image focal plane array detector 38. By the term 2D object scene aperture as used herein is meant any 2D aperture, including squares, rectangles, circles, ellipses, etc., but not including slits. Slits are referred to herein as one-dimensional apertures. The plane of object scene aperture 31 is approximately perpendicular to grating axis 51. Detector 38 lies in an image focal plane which is approximately parallel to the plane of object scene aperture 31. To avoid the above-mentioned problems associated with prior art CTIS, in this invention we employ a two-dimensional computer-generated hologram grating.

Figure 13:
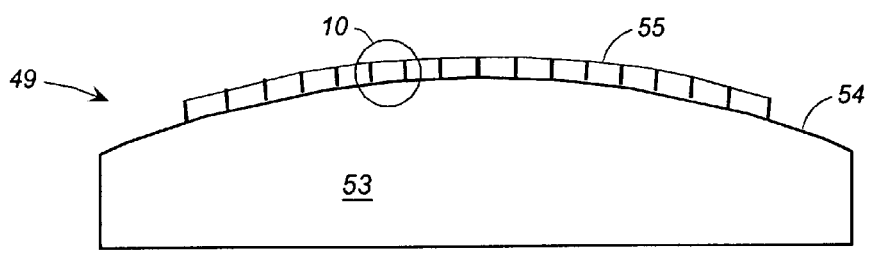
FIG. 13 is an enlarged view of the grating cells of the two-dimensional reflective convex diffraction grating of FIG. 12.
Figure 14A:
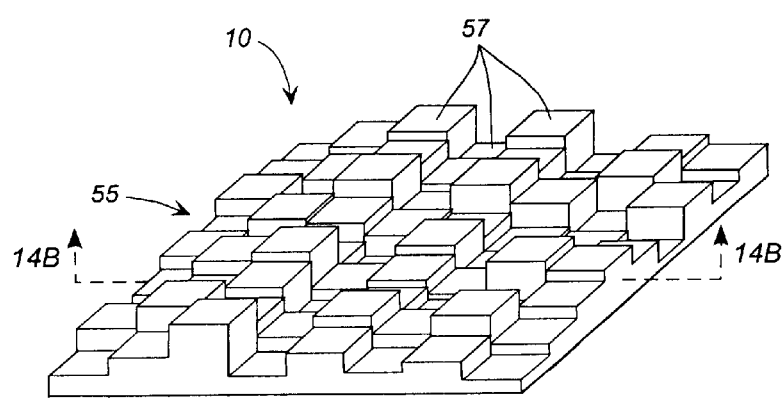
FIG. 14A is a greatly enlarged and detailed three-dimensional view of area 10 of FIG. 13 showing a single cell.
Figure 14B:
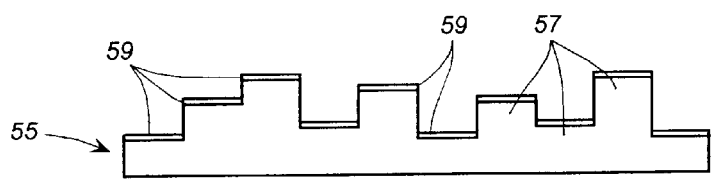
FIG. 14B is a detailed two-dimensional view through plane 14B—14B of FIG. 14A.
Figure 14C:
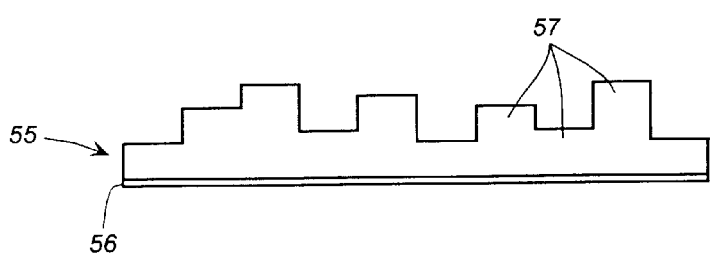
FIG. 14C is a detailed two-dimensional view of another cell, similar to that of FIG. 14B, but with the mirror surface on the back side of the cell.

The 2D reflective convex diffraction grating 49 comprises a substrate 53 having a convex substrate surface 54 which supports a plurality of grating cells 55 as enlarged and illustrated in FIG. 13. Each grating cell 55 comprises a predetermined arrangement of a plurality of pixels 57 as greatly enlarged and illustrated in FIGS. 14A, 14B and 14C. The cells are identical to each other at least in a predetermined zone or area of convex substrate surface 54. Therefore, within such zone the cells have a plurality of pixels oriented with a fixed periodicity on convex substrate surface 54. In one embodiment, the number of predetermined surface zones is about four. In another embodiment, the zones are arranged concentrically on convex substrate surface 54. In FIG. 14B, reflective surface 59 is on the top of pixels 57, whereas in FIG. 14C, reflective surface 56 is on the bottom of pixels 57. In all embodiments diffraction occurs as a result of the phase shift due to the varying heights of pixels 57. Pixel heights are determined by:

(a) Designing the phase profile of the grating to efficiently disperse light into the desired orders. This can be accomplished by, for example, the iterative Fourier transform algorithm {6, 7}.

(b) Converting the phases into pixel heights.
   i. For the embodiment with reflective coating on top of the pixels, depth=(phase/(2*pi))*(lambda/2), where lambda is the design wavelength and depth is the maximum pixel height–pixel height.
   ii. For the embodiment with reflective coating on the bottom of the pixels, height=(phase/(2*pi))* (lambda/($n_{EBR}$−$n_{air}$))/2, where $n_{EBR}$ is the refractive index of the electron beam resist and $n_{air}$ is the refractive index of the grating cover material, most likely air.

Figure 14D:
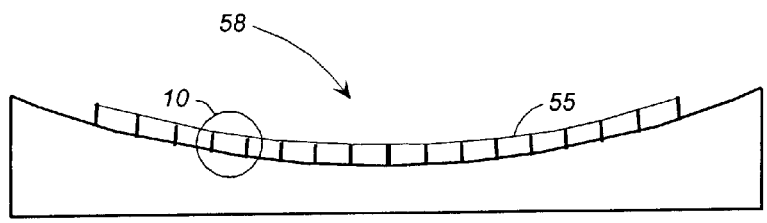
FIG. 14D is an enlarged view of grating cells, similar to that of FIG. 13, but on a two-dimensional reflective concave diffraction grating.
Figure 18:
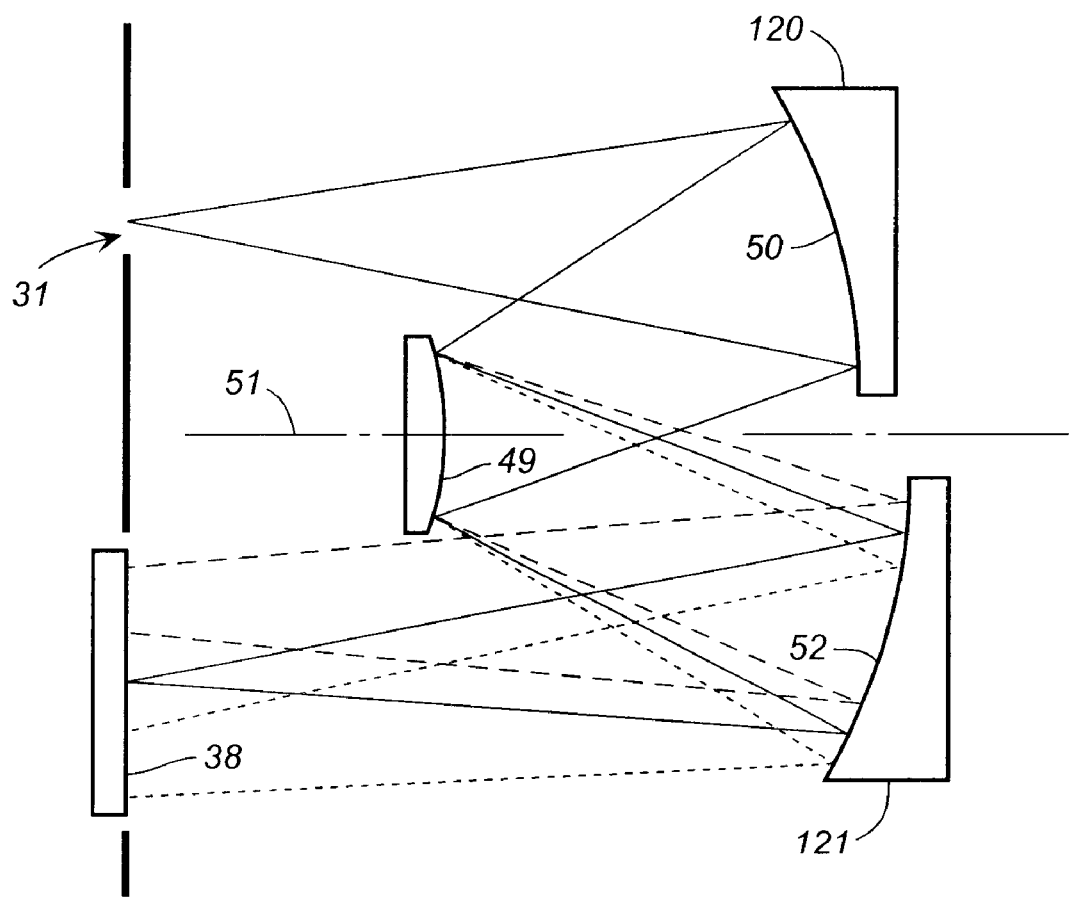
FIG. 18 is another embodiment of this invention employing primary and tertiary mirrors.
Figure 19:
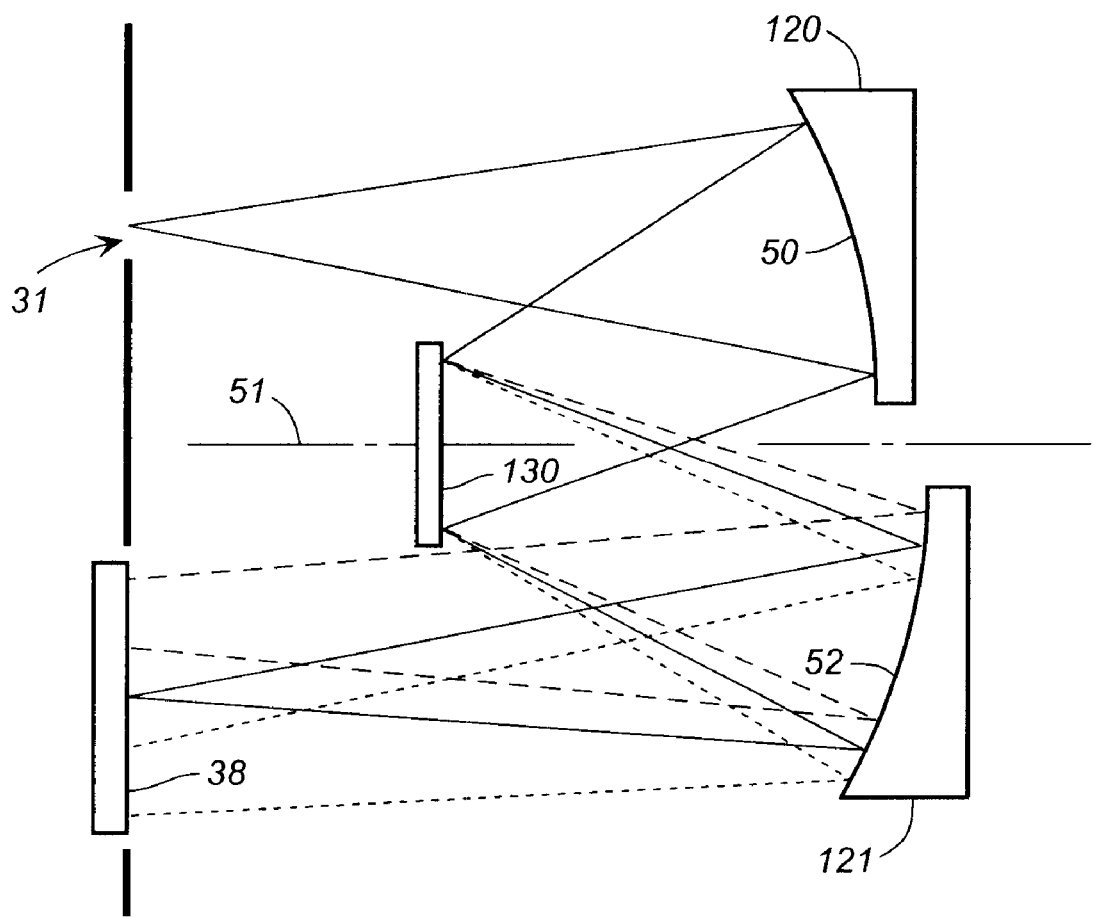
FIG. 19 is another embodiment of this invention similar to FIG. 18 but with a two-dimensional reflective flat diffraction grating.

In one embodiment of this invention, the 2D reflective diffraction grating 58 is concave as shown in FIG. 14D. The reflective surface can be on the top or bottom of the cells as described with regard to FIGS. 14B and 14C. This particular grating can be used, for example, in a spectrometer not having a primary and tertiary mirror surface as shown in FIGS. 12, 18 and 19, in which the spectra enter aperture 31 and incident directly on the concave reflective grating 58 which diffracts the spectra and focuses the image directly on focal plane array detector 38.

In this invention the 2D reflective convex diffraction grating is a computer-generated hologram grating. In one embodiment, the computer-generated hologram grating is on a convex substrate instead of a one-dimensional blazed grating. To determine if a reflective CTIS is feasible, we designed a system for the wavelength range of 6–10 microns.

In one embodiment of this invention, the 2D reflective convex grating is formed by a process comprising:

(a) providing a substrate having a desired curvature,
(b) forming pixels on the convex surface of the substrate by
   (1) spin-coating electron beam resist on the convex surface,
   (2) performing analog direct-write electron-beam lithography to expose the resist in a pattern proportional to the desired depth of the pixel pattern,
   (3) etching away the resist with an effective developer in proportion to the e-beam dose, and leaving a surface relief profile with the desired pixel pattern, and
(c) depositing a thin layer of about 0.05 microns, of a reflective surface, such as aluminum.

Figure 15:
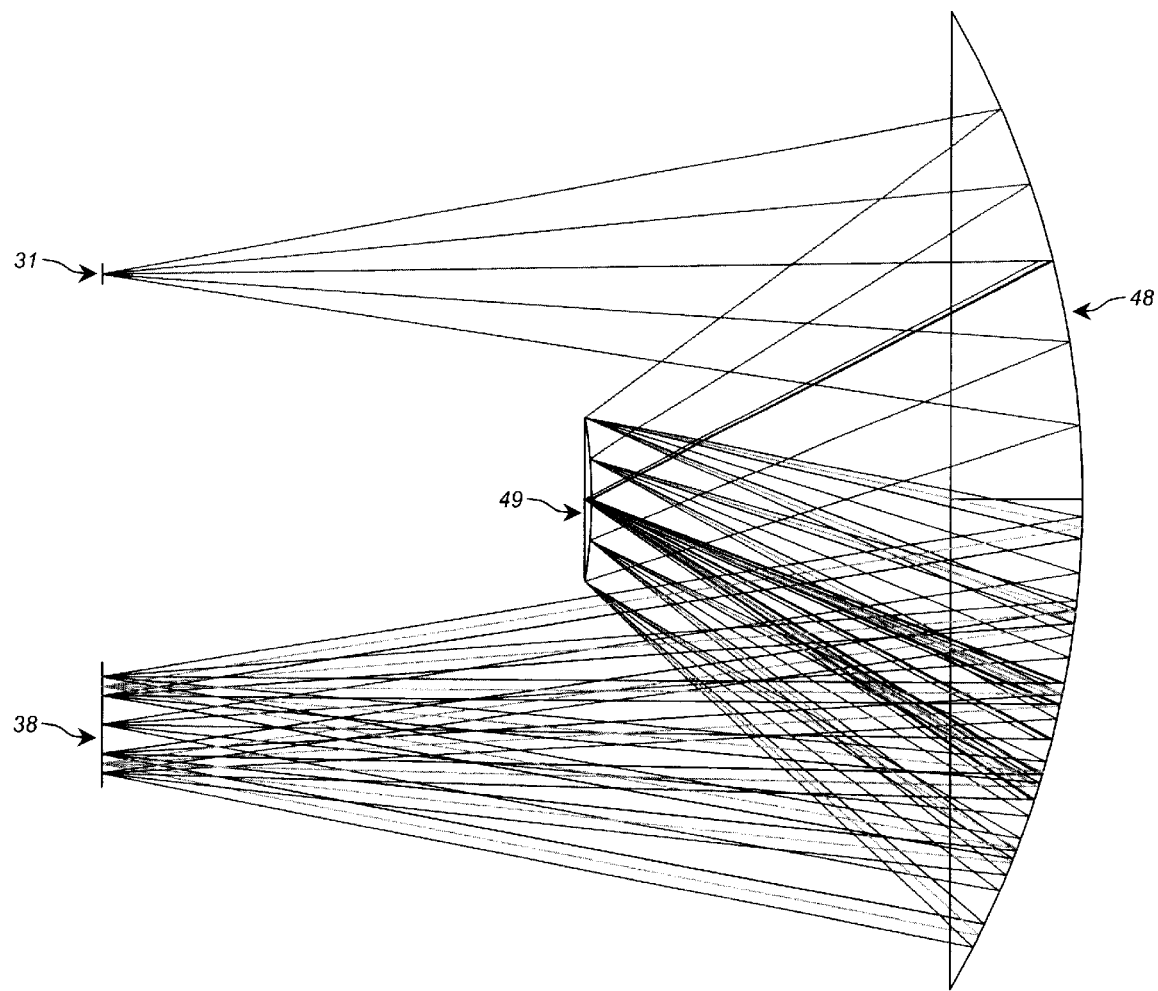
FIG. 15 is a ray-trace plot of a reflective Offner CTIS system, wherein various rays indicate different diffraction orders of the convex grating and not different wavelengths.

FIG. 15, which is similar to FIG. 12, but with several diffraction orders of this invention illustrated with a ray-trace diagram of the system's optics. Table I lists some of the specifications of this particular system. Due to the large diffraction-limited spot size of the infrared radiation, the spatial resolution was reduced to about 60×60 pixels. However, the performance was near diffraction limited and demonstrated that the Offner form will work well for CTIS systems.

TABLE I

Example Reflective CTIS Specifications

| | |
|---|---|
| Wavelength range | 6–10 microns |
| f-number | 3 |
| Object scene aperture | 2 mm × 2 mm |
| Detector | QWIP, 512 × 512, 25 micron square pixels |
| Spatial resolution | 80 × 80 QWIP pixels, about 60 × 60 pixels due to IR diffraction |
| Spectral resolution | <0.5 microns (>8 spectral bands) |
| Length × Width | 100 mm × 100 mm | where QWIP stands for quantum well infrared photodetector {11}.

Figure 16:
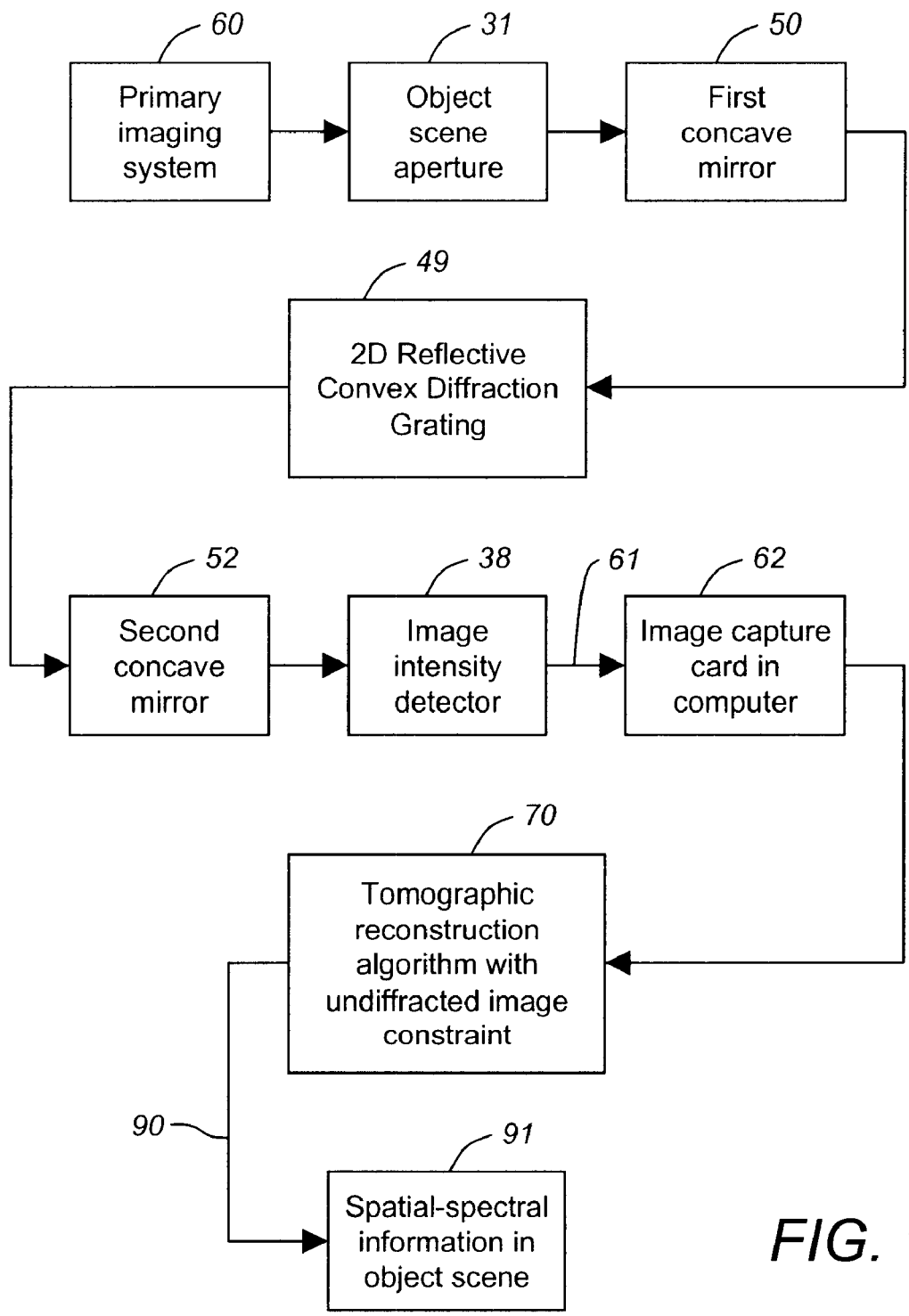
FIG. 16 is an overview of the method of this invention.

An overview of our improved CTIS process of this invention is shown in FIG. 16 where radiation from a primary imaging system 60 is incident upon an object scene aperture 31 and transmitted through to a first concave mirror 50. Radiation is reflected from mirror 50 to 2D reflective convex diffraction grating 49 whereupon it is further reflected to second concave mirror 52 which reflects the radiation to image intensity detector 38. A radiation associated signal 61 is then transmitted from detector 38 to an image capture card 62 in the computer whereupon the signal is processed by a tomographic reconstruction algorithm, which, in one embodiment, includes reconstructing the image scene with our undiffracted image constraint process at 70. After a predetermined number of iterations a data stream 90 is produced of spatial-spectral information from the object scene at 91.

Figure 17:
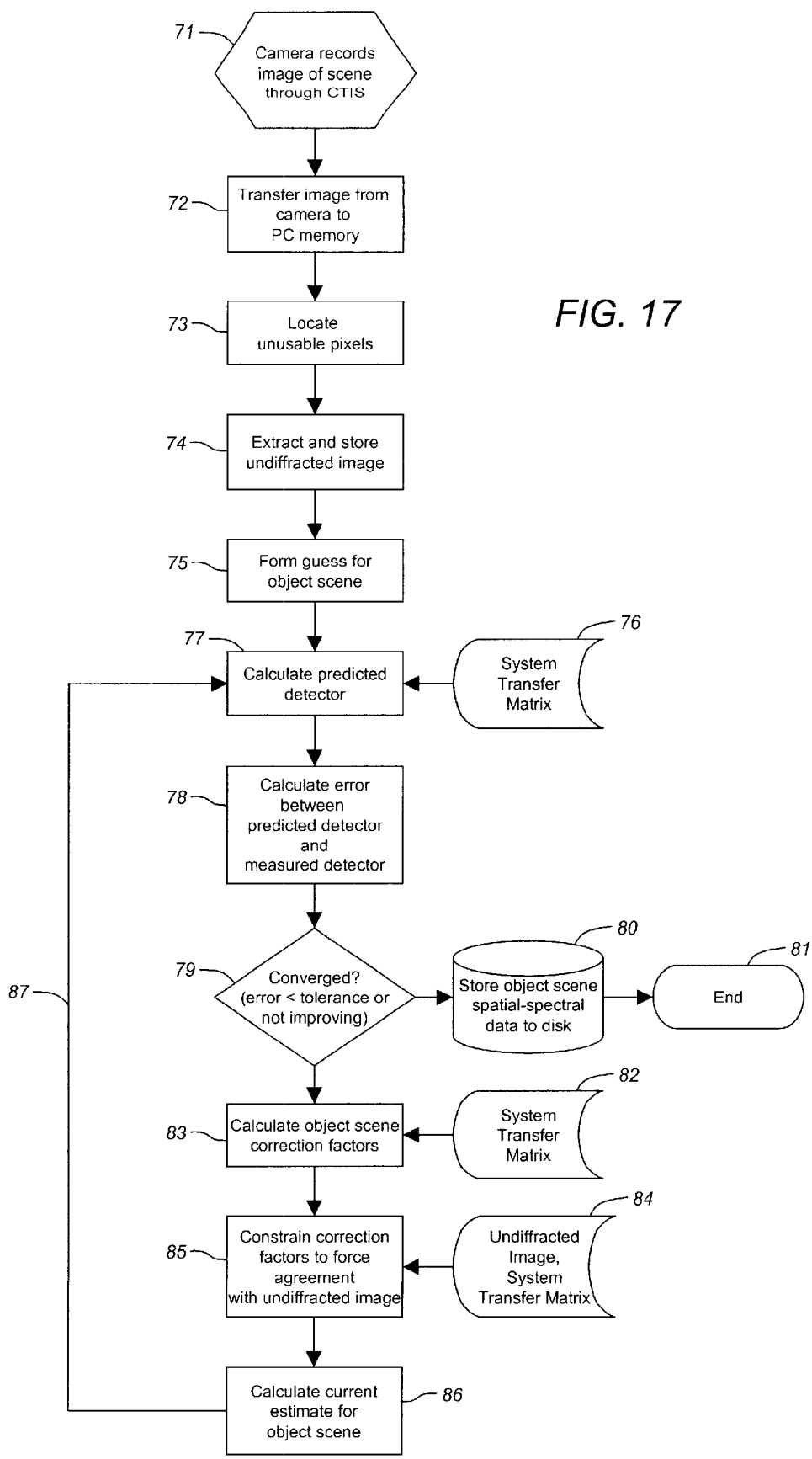
FIG. 17 is tomographic reconstruction algorithm flowchart.

An example of a specific algorithm which conforms with tomographic reconstruction algorithm 70 of FIG. 16 is illustrated in FIG. 17. In this embodiment, a camera first records a CTIS-dispersed image of scene at 71; thereafter, the image is transferred from the camera to computer memory at 72; thereafter, indices of undesirable pixels, which may be saturated or physically bad, are removed from the image at 73; thereafter, the undiffracted image is extracted and stored separately whereupon image processing to remove noise is performed at 74; and thereafter, an initial estimate is made for the scene S which equals the undiffracted image times unity spectrum at 75.

From this point, a system transfer matrix H at 76 is multiplied by a scene S thereby producing a calculated predicted detector image at 77. Then an error between the predicted detector image, $D_p$, and the measured detector image, $D_m$, is calculated ignoring bad pixels at 78. Thereafter, a convergence check is made to determine if the error is less than a predetermined tolerance and, based on the convergence check, a decision is made at 79 to either (i) accept the result and save the scene at 80 and end the iteration at 81, or
(ii) not accept the convergence and iterate the scene again.

If it is decided by the algorithm at 79 that another iteration is required, then the system transfer matrix 82 is used in Eq. (2) to calculate a plurality of correction factors at 83 for each scene voxel that will improve agreement between the predicted detector image and the measured detector image.

The plurality of correction factors are then constrained so that the undiffracted image of the predicted detector at 84 and the measured detector will exactly agree thereby producing a new undiffracted image constraint correction at 85. Thereafter, at 86 a new scene is calculated by multiplying the old scene by the correction factors at 85 thereby producing a signal 87 associated with the calculated current estimate for the object scene. Signal 87 is then sent to operation at 77 and the process is reiterated until the decision at 79 accepts the convergence and saves it at 80 and ends the iteration at 81. In another embodiment of this invention, the operations at 83 and 85 are combined.

Returning now to the reflective optical components, for ultraviolet and visible designs, diffraction is not the limiting factor. Imaging aberrations may limit the performance. In still another embodiment for such wavelengths, the large mirror is split into primary and tertiary mirrors that are optimized separately, as shown in a second embodiment of this invention illustrated in FIG. 18. In FIG. 18 the first concave mirror surface 50 of primary mirror 120 is non-abutting with the second concave mirror surface 52 of tertiary mirror 121.

In still other embodiments of this invention it is not necessary to use the Offner form, for example, a traditional three-mirror configuration with a two-dimensional flat reflective diffraction grating 130 can be used for large f-number systems as shown in FIG. 19.

In the following examples, the useful portion of the spectrum may be the ultraviolet (UV), visible, or the infrared (IR), so the reflective CTIS configuration has advantages over a transmissive CTIS.

EXAMPLE I

The reflective CTIS of this invention is used to perform remote sensing of the earth or other planetary bodies in a fast fly-by. Each CTIS frame is tomographically reconstructed to determine spectra from objects on the ground of such bodies to determine their composition.

For transient events occurring on such bodies, such as eruptions, impacts, explosions, etc., the reflective CTIS of this invention determines the spectra of such transient events even though the precise location is not known in advance. Thus, as long as such event occurs within the reflective CTIS field of view, the spectra are determined.

The advantages of the reflective CTIS of this invention over the prior art transmissive CTIS in this example are that much of the useful remote sensing science occurs in the ultraviolet and infrared portions of the spectrum and the transmissive CTIS would be difficult to design for those spectral regions due to a lack of proper materials. Also, the reflective CTIS will be lighter and hence more amenable to carrying aboard a flying platform.

Further advantages of using our undiffracted image constraint process for reconstructing the image scenes are that the spectra reconstructed by the instrument will be more accurate.

EXAMPLE II

The reflective CTIS of this invention is used to perform spectral imaging of rocket plumes. Our reflective CTIS records an entire movie of frames and then tomographically reconstructs the scene using our undiffracted image constraint process with CTIS. The resulting spatial-spectral movie enables comparison of measured spectra to predicted spectra. Such spectra are useful for identifying rockets from a long range for missile defense, and/or for studying burn chemistry.

The advantages of the reflective CTIS of this invention over the prior art transmissive CTIS in this example are that much of the interesting rocket plume science occurs in the ultraviolet and infrared portions of the spectrum and the transmissive CTIS would be difficult to design for those spectral regions due to a lack of proper materials.

The further advantages of using our undiffracted image constraint process for reconstructing the image scenes are that the spectra reconstructed by the instrument will be more accurate.

EXAMPLE III

The reflective CTIS of this invention is used to perform battlefield surveillance by continuously recording images of the battlefield scene. When an event occurs, the frames of interest are tomographically reconstructed using our undiffracted image constraint process with CTIS thereby yielding the spectra of the region of interest. Such spectra help to determine friend or foe, and/or if there is a chemical/biological threat associated with the event.

The advantages of the reflective CTIS of this invention over the prior art transmissive CTIS in this example are that ultraviolet and infrared battlefield spectral signatures are more useful than visible, and the transmissive CTIS is difficult to design for the infrared spectral regions. An infrared transmissive CTIS would be large and heavy.

The further advantages of using our undiffracted image constraint process for reconstructing the image scenes are that the spectra reconstructed by the instrument will be more accurate.

EXAMPLE IV

The reflective CTIS of this invention is used to record movies of biological active samples. Based on the reconstructed spatial-spectral data, metabolic/chemical processes can be identified. Movies of such events are used to increase the understanding of how the reactions initiate and progress. Such understanding enables formulation of improved drug treatments programs.

An advantage of the reflective CTIS of this invention over the prior art transmissive CTIS in this example is that of much the useful biological spectral information occurs in the ultraviolet and infrared. The transmissive CTIS would be difficult to design for those spectral regions due to a lack of proper materials.

The further advantages of using our undiffracted image constraint process for reconstructing the image scenes are that the spectra reconstructed by the instrument will be more accurate.

EXAMPLE V

The reflective CTIS of this invention is used to perform spatial-spectral imaging of human tissue during internal or external diagnostic procedures using our undiffracted image constraint process with CTIS. Spectra from such diagnostic procedures are used to identify spatial regions of abnormal tissue.

Since a live body is moving during such procedures even though the patient is resting, scanning imaging spectrometers produce corrupt data.

An advantage of the reflective CTIS of this invention over the prior art transmissive CTIS in this example is that of much the useful biological spectral information occurs in the ultraviolet and infrared. The transmissive CTIS would be difficult to design for those spectral regions due to a lack of proper materials.

The further advantages of using our undiffracted image constraint process for reconstructing the image scenes are that the spectra reconstructed by the instrument will be more accurate.

While the preferred embodiments of the present invention have been described, various changes and modifications may be made thereto without departing from the spirit of the invention and the scope of the appended claims. The present disclosure and embodiments of this invention described herein are for purposes of illustration and example and modifications and improvements may be made thereto without departing from the spirit of the invention or from the scope of the claims. The claims, therefore, are to be accorded a range of equivalents commensurate in scope with the advances made over the art.

What is claimed is:

1. A two-dimensional reflective diffraction grating effective for spectrally dispersing incident radiation thereon in a two-dimensional array, the grating having a plurality of cells comprising a plurality of pixels having a fixed periodicity, and a reflective surface on each pixel.

2. The grating of claim 1, wherein the pixels are asymmetric.

3. The grating of claim 1, wherein the grating is convex.

4. The grating of claim 1, wherein the grating is flat.

5. The grating of claim 1, wherein the grating is concave.

6. The grating of claim 1, wherein the reflective surface is an outer surface of the pixels.

7. The grating of claim 1, wherein in each of the cells the pixels therein are abutted.

8. The grating of claim 1, wherein the pixels are square shaped.

9. The grating of claim 1, wherein the cells of the grating are abutted.

10. The grating of claim 1, further comprising a substrate having an outer surface for supporting the plurality of pixels.

11. The grating of claim 10, wherein the reflective surface is between the outer surface of the substrate and the plurality of pixels.

12. The grating of claim 10, wherein the outer surface of the substrate is convex.

13. The grating of claim 12, wherein the convex outer surface of the substrate has a fixed curvature.

14. The grating of claim 13, wherein the fixed curvature is spherical.

15. The grating of claim 1, wherein the grating is electron-beam fabricated.

16. The grating of claim 1, wherein the grating is a computer-generated hologram.

17. A reflective imaging spectrometer for detecting ultraviolet, visible and infrared spectra comprising:
   a two-dimensional reflective diffraction grating effective for spectrally dispersing incident radiation thereon in a two-dimensional array, the grating having a plurality of cells comprising a plurality of pixels having a fixed periodicity, each pixel having a reflective surface;
   a two-dimensional object scene aperture for receiving two-dimensional object scene radiation and for framing a two-dimensional object scene;
   a first concave mirror positioned for reflecting the object scene radiation transmitted through the object scene aperture to the grating;
   a second concave mirror positioned for reflecting radiation reflected and spectrally dispersed from the grating to an image focal plane; and
   detector means positioned at the image focal plane for receiving and recording spectrally dispersed object scene radiation reflected from the second concave mirror in a two dimensional array of spectrally dispersed images.

18. The spectrometer of claim 17, wherein the detector means has an integrate time effective for freezing action in the two-dimensional object scene thereby enabling the recording of a transient event in the two-dimensional object scene without requiring scanning thereof.

19. The spectrometer of claim 17, wherein the detector means comprises:
   a focal plane array detector positioned at the image focal plane for receiving and recording the spectrally dispersed object scene radiation; and
   electronically linked to the detector, first means comprising high-speed computed-tomography reconstruction algorithm operable for reconstructing the spectra of each point in the object scene.

20. The spectrometer of claim 19, wherein the focal plane array detector and the first means are operable for imaging rapidly evolving transient events in the two-dimensional object scene.

21. The spectrometer of claim 19, further comprising second means associated with the first means for reconstructing the object scene with undiffracted image constraint comprising:
   (a) calculating a predicted undiffracted image based on a current estimate of the object scene; thereafter
   (b) calculating a new set of scaling factors for the object scene that force the predicted undiffracted image to equal a measured undiffracted image; and thereafter
   (c) uniformly scaling the entire object scene so that a total number of photons in a predicted detector image remains constant from iteration to iteration.

22. The spectrometer of claim 19, wherein the recording of the spectra occurs in a time span of from about one second to about 20 seconds for each frame of a movie taken of the two-dimensional object scene thereby enabling real time transient event spectral imaging.

23. The spectrometer of claim 17, wherein the grating, and the first and the second concave mirrors are concentrically oriented.

24. The spectrometer of claim 17, wherein the first concave mirror has a first curvature and the second concave mirror has a second curvature which is different than the first curvature.

25. The spectrometer of claim 17, wherein the aperture is approximately rectangular.

26. The spectrometer of claim 17, wherein the aperture has a geometric shape which in combination with the grating enables the entire two-dimensional object scene to approximately fill a field of view of the detector means.

27. The spectrometer of claim 17, wherein the two dimensional array of the spectrally dispersed images produced has no chromatic imaging aberration.

28. The spectrometer of claim 17, wherein a portion of the object scene radiation incident upon the aperture is received by the detector means at all times.

29. The spectrometer of claim 28, wherein the portion of the object scene radiation is at least about 50% of the radiation incident upon the aperture.

30. The spectrometer of claim 28, wherein the portion of the object scene radiation is at least about 70% of the radiation incident upon the aperture.

31. The spectrometer of claim 17, further comprising an unitary primary mirror assembly which spans a grating axis of the grating and comprises the first and the second concave mirrors.

32. The spectrometer of claim 17, wherein the grating is convex.

33. A process for separating spectrally and spatially ultraviolet, visible and infrared spectra from an object scene comprising:
   (a) spectrally dispersing object scene spectra in a two-dimensional array with a two-dimensional diffraction grating effective for spectrally dispersing incident radiation thereon in a two-dimensional array, the grating having a plurality of cells comprising a plurality of pixels having a fixed periodicity;

(b) receiving and recording the spectrally dispersed object scene spectra from the grating with an effective focal plane array detector positioned at an image focal plane;

(c) electronically linking to the detector, first means comprising high-speed computed-tomography reconstruction algorithm;

(d) associating with the first means, second means for reconstructing the object scene with undiffracted image constraint comprising:

(i) calculating a predicted undiffracted image based on a current estimate of the object scene, thereafter (ii) calculating a new set of scaling factors for the object scene that force the predicted undiffracted image to equal a measured undiffracted image, and thereafter (iii) uniformly scaling the entire object scene so that a total number of photons in a predicted detector image remains constant from iteration to iteration; and thereafter (e) producing a reconstructed spectral and spatial object scene.

34. The process of claim 33, wherein the grating is transmissive.

35. The process of claim 33, wherein the grating is reflective.

36. The process of claim 35, wherein the grating is flat.

37. The process of claim 35, wherein the grating is convex.

38. The process of claim 35, wherein the grating is concave.

* * * * *